United States Patent
Tyler

(10) Patent No.: US 11,336,051 B1
(45) Date of Patent: May 17, 2022

(54) HEADER SEAL FOR HEADER CONNECTOR OF POWER CONNECTOR SYSTEM

(71) Applicant: TE Connectivity Services GmbH, Schaffhausen (CH)

(72) Inventor: Adam Price Tyler, Rochester Hills, MI (US)

(73) Assignee: TE Connectivity Services GmbH

( * ) Notice: Subject to any disclaimer, the term of this patent is extended or adjusted under 35 U.S.C. 154(b) by 16 days.

(21) Appl. No.: 17/088,015

(22) Filed: Nov. 3, 2020

(51) Int. Cl.
*H01R 13/52* (2006.01)
*H01R 13/504* (2006.01)
*B60R 16/03* (2006.01)
*H01R 13/533* (2006.01)
*H01R 13/11* (2006.01)

(52) U.S. Cl.
CPC ......... *H01R 13/5219* (2013.01); *B60R 16/03* (2013.01); *H01R 13/504* (2013.01); *H01R 13/5202* (2013.01); *H01R 13/533* (2013.01); *H01R 13/112* (2013.01); *H01R 2201/26* (2013.01)

(58) Field of Classification Search
CPC ............ H01R 13/5202; H01R 13/5219; H01R 13/504; H01R 13/533; H01R 13/112; H01R 2201/26; B60R 16/03
USPC ....................................................... 439/283
See application file for complete search history.

(56) References Cited

U.S. PATENT DOCUMENTS

| | | | | |
|---|---|---|---|---|
| 5,083,933 A | * | 1/1992 | Colleran | H01R 13/6272 439/271 |
| 5,116,236 A | * | 5/1992 | Colleran | H01R 13/4362 439/271 |
| 6,113,407 A | * | 9/2000 | Martin | H01R 13/521 439/205 |
| 6,773,278 B2 | * | 8/2004 | Valasek, Jr. | H01R 13/62933 439/157 |
| 7,052,293 B2 | * | 5/2006 | Koshy | H01R 13/533 439/157 |
| 8,523,581 B2 | * | 9/2013 | Martin | H01R 12/724 439/83 |
| 9,048,587 B2 | * | 6/2015 | Marsh | H01R 13/658 |
| 9,431,771 B1 | * | 8/2016 | Sundarakrishnamachari | H01R 13/6583 |
| 10,128,624 B2 | | 11/2018 | Tyler et al. | |
| 10,141,669 B2 | | 11/2018 | Tyler et al. | |
| 10,784,595 B2 | | 9/2020 | Tyler | |
| 10,868,376 B2 | * | 12/2020 | Chalas | H01R 13/6594 |
| 2018/0034171 A1 | * | 2/2018 | Tyler | H01R 4/023 |
| 2018/0034178 A1 | * | 2/2018 | Tyler | H01R 13/193 |

(Continued)

*Primary Examiner* — Abdullah A Riyami
*Assistant Examiner* — Vladimir Imas

(57) ABSTRACT

A header connector includes a header housing having a mating end and a mounting end. The mounting end is configured to be mounted to a supporting structure. The header housing has shroud walls forming a header chamber configured to receive a plug connector. The header connector includes a header seal coupled to the header housing having an upper portion with an upper sealing surface and a lower portion with a lower sealing surface. The upper portion extends into the header chamber and the upper sealing surface is configured to interface with the plug connector to form a seal between the header housing and the plug connector. The lower portion extends to the mounting end and the lower sealing surface is configured to interface with the supporting structure to form a seal between the header housing and the supporting structure.

20 Claims, 6 Drawing Sheets

(56) References Cited

U.S. PATENT DOCUMENTS

| | | | |
|---|---|---|---|
| 2018/0034219 A1* | 2/2018 | Tyler | H01R 13/62938 |
| 2018/0351311 A1* | 12/2018 | Maturo | H01R 13/521 |
| 2020/0303870 A1* | 9/2020 | Durse | H01R 13/512 |
| 2021/0175672 A1* | 6/2021 | Hitchcock | H01R 24/76 |

* cited by examiner

HEADER SEAL FOR HEADER CONNECTOR OF POWER CONNECTOR SYSTEM

BACKGROUND OF THE INVENTION

The subject matter herein relates generally to power connector systems.

Power terminals are used to make a power connection between components in high power applications, such as in electric or hybrid electric vehicles between the battery and other components, such as the electric motor, the inverter, the charger, and the like. The power terminals are held by a header connector and a plug connector mated to the header connector. Due to the harsh environment in which the power connectors are used, such as in vehicles, environmental seals are typically provided. For example, a header seal is typically provided at the interface between the header connector and the chassis or other structure to which the header connector is mounted. A separate plug seal is typically provided at the mating interface between the plug connector and the header connector. For example, the plug seal may surround the perimeter of the plug connector, which is sealed to the header connector when the power connectors are mated. Retention of the plug seal is problematic. For example, the seal may have pinch points at the retention locations, which affect the shape of the plug seal and thus the sealing effectiveness. Additionally, the plug seal is subject to rolling or scooping during mating, leading to improper sealing. The header seal is subject to similar issues with pinch points that affect the shape of the header seal, and thus the sealing effectiveness of the header seal.

A need remains for a robust sealing arrangement for power connectors of a power connector system.

BRIEF DESCRIPTION OF THE INVENTION

In one embodiment, a header connector is provided. The header connector includes a header housing having a mating end and a mounting end. The mounting end is configured to be mounted to a supporting structure. The header housing has shroud walls forming a header chamber configured to receive a plug connector. The header connector includes a header terminal arranged in the header chamber for mating with the plug connector. The header connector includes a header seal coupled to the header housing. The header seal includes an upper portion having an upper sealing surface and a lower portion having a lower sealing surface. The upper portion extends into the header chamber. The upper sealing surface is configured to interface with the plug connector to form a seal between the header housing and the plug connector. The lower portion extends to the mounting end. The lower sealing surface is configured to interface with the supporting structure to form a seal between the header housing and the supporting structure.

In a further embodiment, a header connector is provided. The header connector includes a header housing having a mating end and a mounting end. The mounting end has a flange configured to be mounted to a supporting structure. The header housing has shroud walls extending from the flange and forming a header chamber configured to receive a plug connector. The header housing has a seal channel extending through the flange from the header chamber to the mounting end. The header connector includes a header terminal arranged in the header chamber for mating with the plug connector. The header connector includes a header seal coupled to the header housing. The header seal is received in the seal channel. The header seal includes an upper portion having an upper sealing surface and a lower portion having a lower sealing surface. The upper portion extends into the header chamber. The upper sealing surface is configured to interface with the plug connector to form a seal between the header housing and the plug connector. The lower portion extends to the mounting end. The lower sealing surface is configured to interface with the supporting structure to form a seal between the header housing and the supporting structure.

In another embodiment, a power connector system is provided. The power connector system includes a header connector including a header housing having a mating end and a mounting end. The mounting end is configured to be mounted to a supporting structure. The header housing has shroud walls forming a header chamber. The header connector includes a header terminal arranged in the header chamber. The header connector includes a header seal coupled to the header housing. The header seal includes an upper portion having an upper sealing surface and a lower portion having a lower sealing surface. The upper portion extending into the header chamber. The lower portion extending to the mounting end. The lower sealing surface is configured to interface with the supporting structure to form a seal between the header housing and the supporting structure. The power connector system includes a plug connector mated with the header connector. The plug connector includes a plug housing holding a tab terminal. The plug housing has a sealing wall. The tab terminal has a cable end and a mating end. The mating end is coupled to the header terminal during mating to electrically connect the tab terminal with the header terminal. The plug housing is received in the header chamber such that the sealing wall interfaces with the upper sealing surface of the upper portion of the header seal.

DETAILED DESCRIPTION OF THE INVENTION

Figure 1:
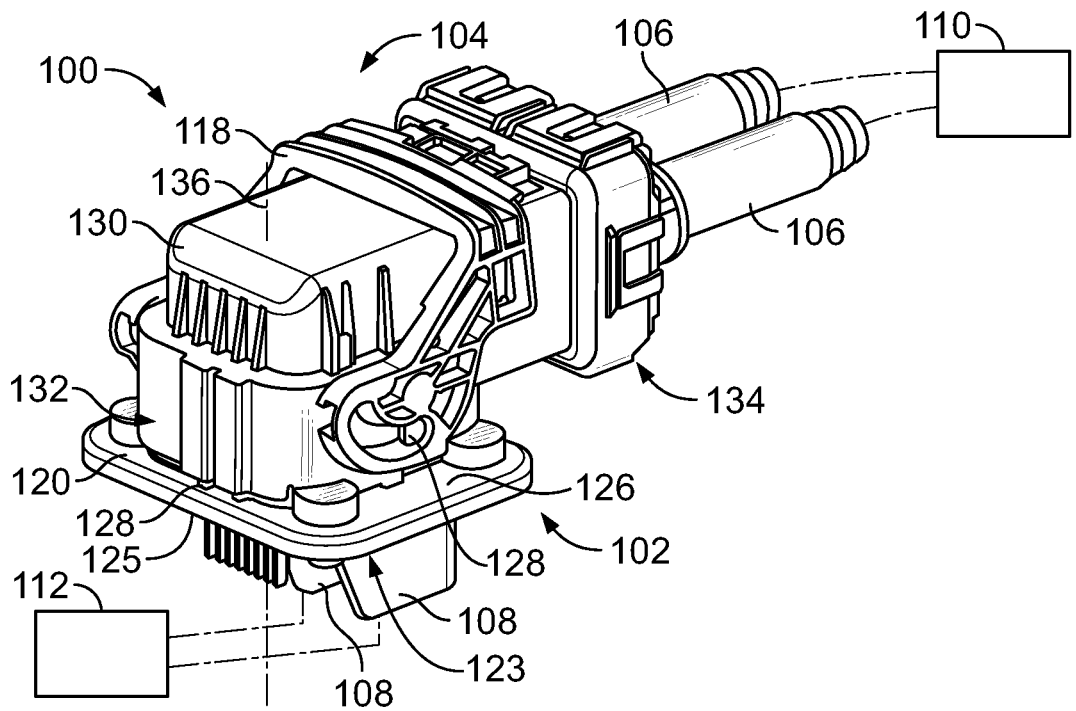
FIG. 1 is a perspective view of a power connector system formed in accordance with an exemplary embodiment in an assembled and mated state.
Figure 2:
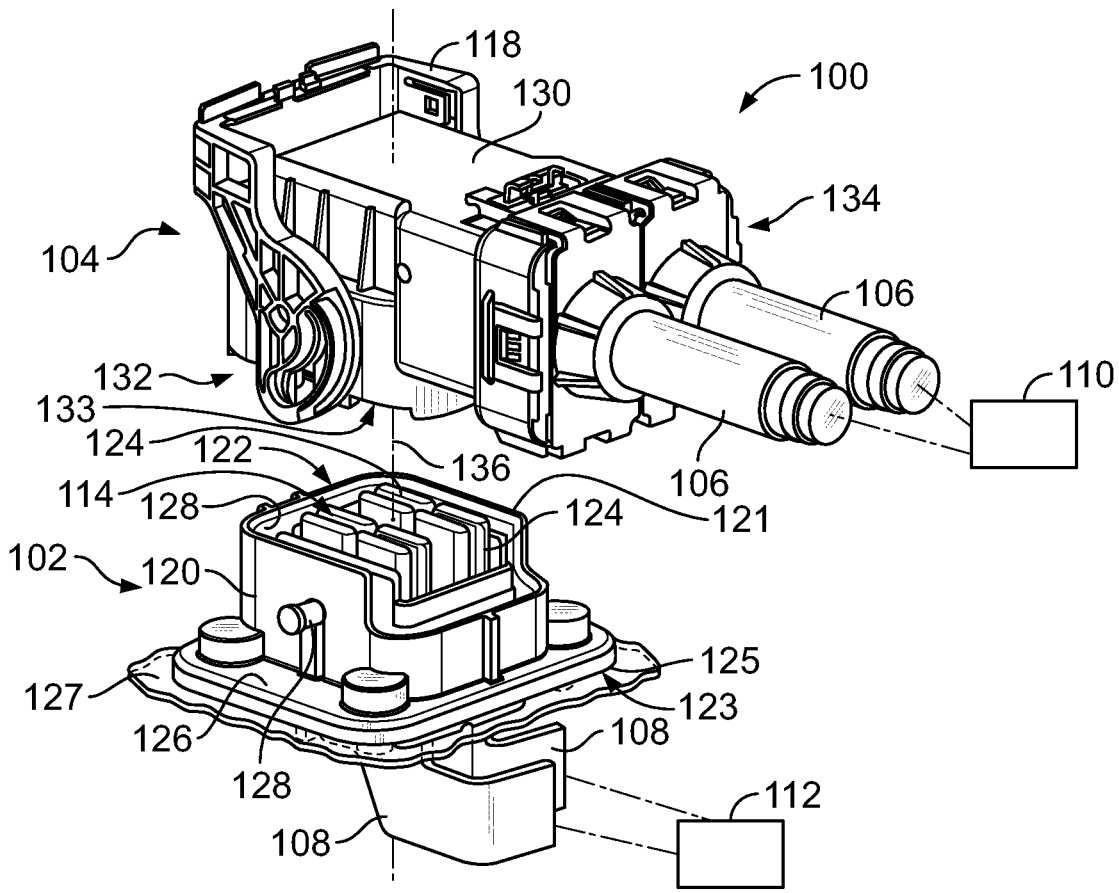
FIG. 2 is a perspective view of the power connector system in an unmated state in accordance with an exemplary embodiment.

FIG. 1 is a perspective view of a power connector system 100 formed in accordance with an exemplary embodiment in an assembled and mated state. FIG. 2 is a perspective view of the power connector system 100 in an unmated state. The power connector system 100 includes a header connector 102 and a plug connector 104 configured to be mated with the header connector 102. In an exemplary embodiment, the power connector system 100 is a high power connector system that is used to transfer power between various components as part of a high power circuit. In a particular application, the power connector system 100 is a battery system, such as a battery system of a vehicle, such as an electric vehicle or hybrid electric vehicle; however the power connector system 100 is not intended to be limited to such battery systems.

The plug connector 104 is configured to be electrically connected to a component 110, such as through one or more power cables 106. For example, the plug connector 104 may be electrically connected to a battery, a charger, an inverter, an electric motor or another type of component. The header connector 102 is configured to be electrically connected to a component 112, such as through a power bus bar 108 (also referred to herein as power bus 108); however the header connector 102 may be electrically connected to the component 112 by other means, such as a terminal, power wire or other connector. For example, the header connector 102 may be electrically connected to a battery pack, such as through a battery distribution unit, a manual service disconnect, a charger, an inverter, an electric motor, or another type of component. The battery distribution unit may manage the power capacity and functionality of the power connector system 100, such as by measuring current and regulating power distribution of the battery pack.

In the illustrated embodiment, the power connector system 100 is a right angle connector system where the connectors 102, 104 are mated in a direction perpendicular to the power wires. Other mating orientations are possible in alternative embodiments, such as a vertical direction where the cables 106 are parallel to the mating direction rather than perpendicular to the mating direction. Optionally, the plug connector 104 may be removably coupled to the header connector 102 to disconnect the high power circuit of one or more of the components, such as the battery pack, the electric motor, the inverter, or other components of the vehicle, such as for maintenance, repair or for another reason. When mated, one or more header terminals 114 (FIG. 2) of the header connector 102 are mated with corresponding plug terminals 116 (shown in FIG. 3) of the plug connector 104, such as at mating interfaces thereof. Having a greater number of terminals 114 and/or 116 increases the current carrying capacity of the system 100. Optionally, each plug terminal 116 may be terminated to a corresponding power cable 106.

In an exemplary embodiment, the header connector 102 and/or the plug connector 104 may include a high voltage interlock (HVIL) circuit to control the high voltage power circuit during opening and closing or mating and unmating of the connectors 102, 104. For example, both connectors 102, 104 may include corresponding HVIL terminals. The HVIL circuit may be electrically connected to the component 112 and/or the component 110. In an exemplary embodiment, the plug connector 104 utilizes a lever 118 to unmate and/or mate the connectors 102, 104, which may open/close the high voltage circuit and the HVIL circuit during unmating/mating of the connectors 102, 104. The HVIL circuit may be opened first during unmating to shut of the high voltage circuit prior to opening or unmating of the terminals 116, 114, which may reduce the likelihood of damage, such as from arcing. In an exemplary embodiment, the high voltage conducting surfaces of the connectors 102, 104 are finger proof and touch-safe.

The header connector 102 includes a header housing 120 having a mating end 122 and a mounting end 123. In the illustrated embodiment, the mating end 122 is opposite the mounting end 123, such as with the mating end 122 at a top 121 of the header housing 120 and the mounting end 123 at a bottom 125 of the header housing 120. Other orientations are possible in alternative embodiments, such as located at front and/or rear and/or sides of the header housing 120. The header housing 120 holds one or more of the header terminals 114. Optionally, the header terminals 114 may be fork terminals having sockets defined by spring beams on both sides of the sockets to mate with both sides of the plug terminal 116, as described in further detail below; however, other types of header terminals may be used in alternative embodiments. The header terminals 114 may be shrouded to protect the header terminals 114. For example, the header terminals 114 may have covers or touch guards 124 such that the header terminals 114 are touch-safe. The header housing 120 includes a flange 126 at the mounting end 123 for mounting the header housing 120 to a supporting structure 127, such as a chassis, a panel, a wall, a mounting bracket or another component of the vehicle. Optionally, the header connector 102 may be electrically grounded to the supporting structure 127. In an exemplary embodiment, the header connector 102 includes a header seal (shown in FIG. 4) at the mounting end 123 configured to be sealed against the supporting structure 127. Optionally, the header housing 120 may be mounted horizontally; however, other orientations are possible in alternative embodiments. In an exemplary embodiment, the header housing 120 includes guide features 128 for guiding mating of the plug connector 104 with the header connector 102. For example, the guide features 128 may be ribs, posts, slots, keying features or other types of guide features.

The plug connector 104 includes a plug housing 130 configured to be coupled to the header housing 120. The plug housing 130 includes a mating end 132 and a cable end 134. The mating end 132 is mated to the mating end 122 of the header housing 120. In an exemplary embodiment, the plug housing 130 includes a sealing wall 133 (FIG. 2) at the mating end configured to interface with the header seal within the interior of the header housing 120 to form a sealed connection between the plug connector 104 and the header connector 102. The power cables 106 extend from the cable end 134. In an exemplary embodiment, the housing 130 is a right-angle housing holding the power cables 106 and the plug terminals 116 (shown in FIG. 3) perpendicular to a mating direction along a mating axis 136. The power cables 106 are at a right angle with respect to the mating axis 136. Other orientations are possible in alternative embodiments.

In an exemplary embodiment, the lever 118 is rotatably coupled to the housing 130. The lever 118 is configured to engage the header housing 120, such as corresponding guide features 128, to secure the plug connector 104 to the header connector 102. Optionally, the lever 118 may include a slot that receives corresponding guide features 128 to control mating and unmating of the plug connector 104 to the header connector 102. For example, as the lever 118 is rotated closed, the housing 130 may be pulled down onto the header housing 120. Conversely, as the lever 118 is raised, the housing 130 may be pressed away from and unmated from the header housing 120. The high power circuit and the HVIL circuit of the power connector system 100 may be opened and closed as the plug connector 104 is unmated from and mated to the header connector 102.

Figure 3:
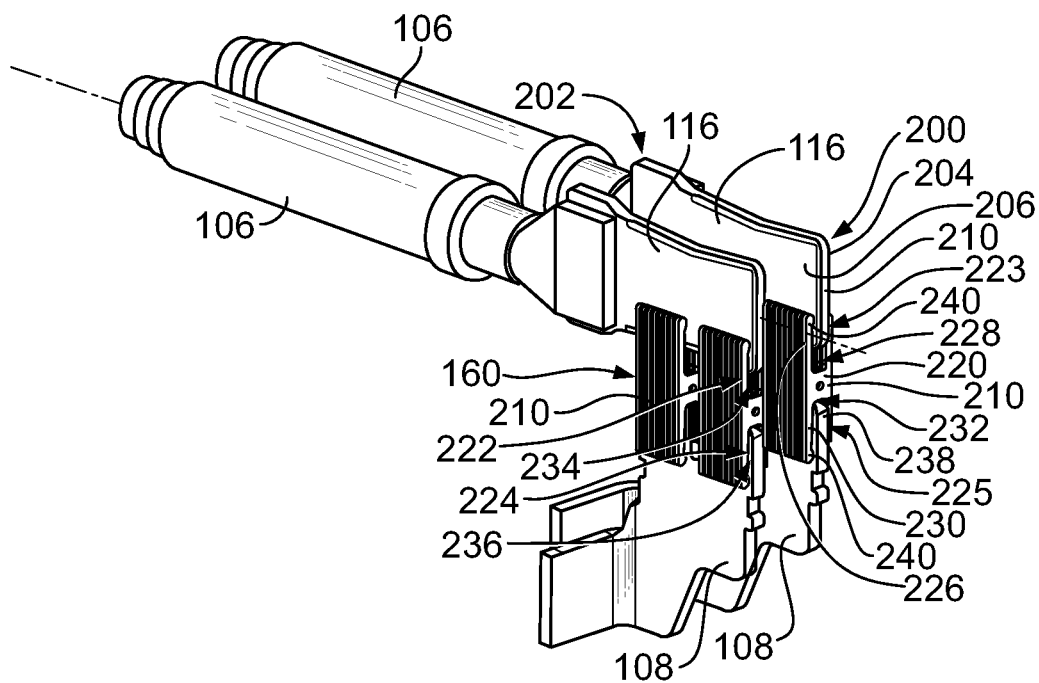
FIG. 3 is a perspective view of a portion of the power connector system showing the plug terminals and the header terminals in accordance with an exemplary embodiment.

FIG. 3 is a perspective view of a portion of the power connector system 100 showing the plug terminals 116 and the header terminals 114. The header housing 120 and the plug housing 130 are removed to illustrate the plug terminals 116 and the header terminals 114.

The plug terminals 116 are terminated to the power cables 106. For example, the plug terminals 116 may be welded to the power cables 106. The plug terminals 116 may be terminated to the power cables 106 by other means in alternative embodiment, such as crimping. In the illustrated embodiment, the plug terminals 116 are tab terminals that include tabs or blades having large surface areas for interfacing with the header terminals 114. The plug terminals 116 are referred to hereinafter as tab terminals 116. Each tab terminal 116 is generally planar (at least along the tab or blade section) and extends between a mating end 200 and a cable end 202. Other types of plug terminals 116 may be used in alternative embodiments, such as a receptacle terminal, a socket terminal or another type of terminal.

The header terminals 114 are configured to be electrically connected to the tab terminals 116. In an exemplary embodiment, the header terminals 114 are also electrically connected to the power busses 108 of the header connector 102 (shown in FIG. 2). However, in alternative embodiments, the header terminals 114 may be integral with the power busses 108. In the illustrated embodiment, the header terminals 114 are double-ended fork terminals and may be referred to hereinafter as fork terminals 114.

Each of the header terminals 114 includes a series of contact members 210 disposed side-by-side in a stacked arrangement. Each contact member 210 includes a main body 220 between a first mating end 222 and a second mating end 224. The contact members 210 each include a pair of spring beams 226 defining a socket 228 at the first mating end 222 and a pair of spring beams 230 defining a socket 232 at the second mating end 224. When the contact members 210 are stacked together to define the header terminal 114, the sockets 228 of the contact members 210 align within the header terminal 114 to define a tab socket 234 at the first mating end 222. The tab socket 234 at the first mating end 222 is configured to receive the mating edge of the tab terminal 116. Similarly, the sockets 232 of the individual contact members 210 align within the header terminal 114 to define a bus bar socket 236 at the second mating end 224 that is configured to receive a mating end 238 of the corresponding power bus 108. In the illustrated embodiment, the spring beams 226 of the contact members 210 in each header terminal 114 define a first fork contact 223 at the first mating end 222, and the spring beams 230 of the contact members 210 define a second fork contact 225 at the second mating end 224.

The spring beams 226, 230 are deflectable to receive the tab terminal 116 and the power bus 108, respectively. When mated, the spring beams 226, 230 are spring biased against the tab terminal 116 and the power bus 108, respectively. The spring beams 226 are arranged on both sides of the socket 228 to engage the first and second sides 204, 206 of the tab terminal 116.

In an exemplary embodiment, each spring beam 226 defines a mating interface 240 at or near a distal end of the spring beam 226. The mating interfaces 240 may be defined by bumps or protrusions at the distal ends of the spring beams 226. In an exemplary embodiment, each fork contact 223, which is defined by multiple spring beams 226 stacked together, includes multiple points of contact with the tab terminal 116. For example, each mating interface 240 on a spring beam 226 in the stack defines a different point of contact with the tab terminal 116. Providing multiple contact members 210 in each header terminal 114 results in multiple points of contact between the tab terminal 116 and the header connector 102.

The fork contacts 225 at the second mating end 224 (for example, the power bus mating side) of each header terminal 114 provides multiple points of contact with the power bus 108. For example, each spring beam 230 defines a mating interface 240 at or near a distal end of the spring beam 230. The mating interfaces 240 of the multiple spring beams 230 in the stack define different points of contact with the power bus 108. Providing multiple contact members 210 in each header terminal 114 results in multiple points of contact between the power bus 108 and the header connector 102. Increasing the number of contact members 210 in each header terminal 114 and/or increasing the number of header terminals 114 increases the amount of current carrying capacity of the header connector 102.

Optionally, the fork contacts 223, 225 of a single header terminal 114 may be identical, with the tab terminal 116 configured to plug into the tab socket 234 and the power bus 108 configured to plug into the bus bar socket 236. The header terminals 114 are easily manufactured and assembled. For example, the contact members 210 may be stamped and formed and any number of the contact members 210 may be arranged together within each of the header terminals 114. Other types of header terminals may be provided in alternative embodiments, such as socket terminals (for example, box-shaped socket terminal) or one or more spring beam type terminals.

Figure 4:
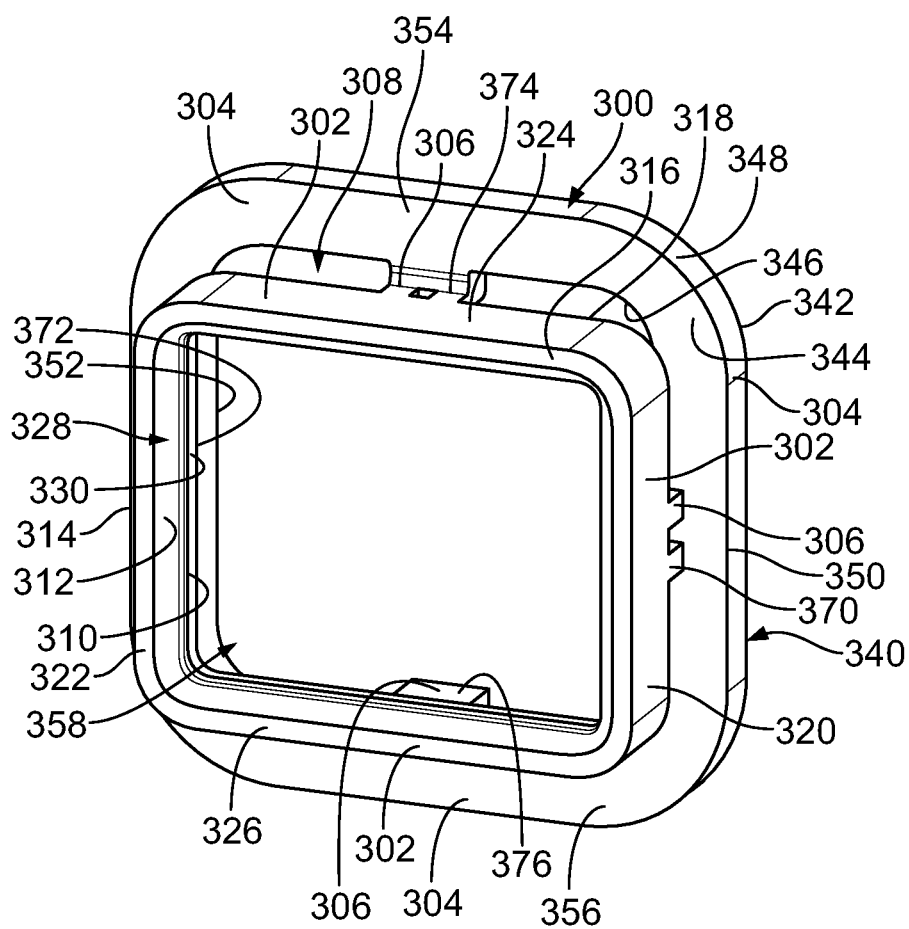
FIG. 4 is a top perspective view of a header seal in accordance with an exemplary embodiment.

FIG. 4 is a top perspective view of a header seal 300 in accordance with an exemplary embodiment. The header seal 300 is a multi-seal having multiple sealing surfaces configured to seal the header connector 102 (shown in FIG. 2) with multiple components, such as both the plug connector 104 (shown in FIG. 2) and the support structure 127 (shown in FIG. 2). Using the multi-seal to provide sealing to multiple components using a single seal reduces part count and makes assembly and manufacture of the system easier. In an exemplary embodiment, the header seal 300 is configured to be molded in-situ on the header housing 120 to form the header seal 300 in place and eliminate assembly steps, which reduces assembly time and reduces assembly error from improper or inconsistent positioning of the sealing structure(s).

The header seal 300 includes an upper portion 302, a lower portion 304 and one or more connecting portions 306 between the upper portion 302 and the lower portion 304. In an exemplary embodiment, the upper and lower portions 302, 304 are separate from each other and spaced apart from each other with a gap 308 formed between the upper and lower portions 302, 304. The connecting portions 306 span across the gap 308 between the upper and lower portions 302, 304 to connect the upper and lower portions 304. In an exemplary embodiment, the header seal 300 is a monolithic, unitary structure with the upper portion 302, the lower portion 304 and the connecting portions 306 being co-molded and integral with each other. In an exemplary embodiment, the header seal 300 is manufactured from an elastomeric material, such as a rubber material, a fluorocarbon material, and the like.

The upper portion 302 includes an upper sealing surface 310 at an interior 312 of the upper portion 302. An exterior 314 of the upper portion 302 is configured to be coupled to the header housing 120. The upper sealing surface 310 faces inward to interface with the plug housing 130 when the plug connector 104 is mated with the header connector 102. The upper sealing surface 310 is deformable when interfacing with the plug connector 104, such as to conform against and seal to the sealing walls 133 of the plug housing 130. The upper portion 302 extends between a top 316 and a bottom 318. The connecting portions 306 extend from the bottom 318.

In an exemplary embodiment, the upper portion 302 includes a plurality of upper segments that form a rectangular shaped (for example, square-shaped) structure. The upper portion 302 may have other shapes in alternative embodiments, such as an oval shape, a circular shape or other shapes. The upper portion 302 includes a first upper side segment 320 and a second upper side segment 322 opposite the first upper side segment 320. The upper portion 302 includes a first upper end segment 324 and a second upper end segment 326 opposite the first upper end segment 324. The first and second upper end segments 324, 326 extend between the first and second upper side segments 320, 322. The upper segments 320, 322, 324, 326 surrounded upper opening 328. The upper sealing surfaces 310 of the upper segments 320, 322, 324, 326 face inward toward the upper opening 328.

In an exemplary embodiment, the upper sealing surfaces 310 include sealing ribs 330 along the interior 312 of the upper portion 302. Optionally, each upper segment 320, 322, 324, 326 includes a plurality of the sealing ribs 330. The sealing ribs 330 may be chevron shaped in various embodiments. For example, the sealing ribs 330 may form peaks at inner ends of the sealing ribs 330. In various embodiments, the sealing ribs 330 may be asymmetrical. For example, the sealing ribs 330 may have different sizes and/or different shapes.

The lower portion 304 includes a lower sealing surface 340 at a bottom 342 of the lower portion 304. A top 344 of the lower portion 304 is configured to be coupled to the header housing 120. The connecting portions 306 extend from the top 344. The lower sealing surface 340 faces downward to interface with the support structure 127 when the header connector 104 is mounted to the support structure 127. The lower sealing surface 340 is deformable when interfacing with the support structure 127, such as to conform against and seal to the support structure 127. The lower portion 304 extends between an interior 346 and an exterior 348.

In an exemplary embodiment, the lower portion 304 includes a plurality of lower segments that form a rectangular shaped (for example, square-shaped) structure. The lower portion 304 may have other shapes in alternative embodiments, such as a circular shape, an oval shape, or another shape. The lower portion 304 includes a first lower side segment 350 and a second lower side segment 352 opposite the first lower side segment 350. The lower portion 304 includes a first lower end segment 354 and a second lower end segment 356 opposite the first lower end segment 354. The first and second lower end segments 354, 356 extend between the first and second lower side segments 350, 352. The lower segments 350, 352, 354, 356 surround a lower opening 358. The lower sealing surfaces 340 of the lower segments 350, 352, 354, 356 face downward toward the lower opening 358.

In an exemplary embodiment, the lower sealing surfaces 340 include sealing ribs 360 along the bottom 342 of the lower portion 304. Optionally, each lower segment 350, 352, 354, 356 includes a plurality of the sealing ribs 360. The sealing ribs 360 may be chevron shaped in various embodiments. For example, the sealing ribs 360 may form peaks at bottom ends of the sealing ribs 360. In various embodiments, the sealing ribs 360 may be asymmetrical. For example, the sealing ribs 360 may have different sizes and/or different shapes.

The connecting portions 306 extend between the upper portion 302 and the lower portion 304. Optionally, the connecting portions 306 may be approximately centered along the corresponding upper and lower segments. In other various embodiments, the connecting portions 306 may be located proximate to the corners of the corresponding upper and lower segments. In an exemplary embodiment, the connecting portions 306 are formed during the molding process, allowing the seal material to flow from the lower portion 304 to the upper portion 302 during forming of the header seal 300. The connecting portions 306 are spaced periodically around the header seal 300. The connecting portions 306 span across the gap 308 to connect the upper portion 302 and the lower portion 304. In an exemplary embodiment, the header seal 300 includes one or more first side connecting portions 370, one or more second side connecting portions 372, one or more first end connecting portions 374, and one or more second end connecting portions 376. The first side connecting portions 370 extend between the first upper and lower side segments 320, 350. The second side connecting portions 372 extend between the second upper and lower side segments 322, 352. The first end connecting portions 374 extend between the first upper and lower end segments 324, 354. The second end connecting portions 376 extend between the second upper and lower end segments 326, 356.

Figure 5:
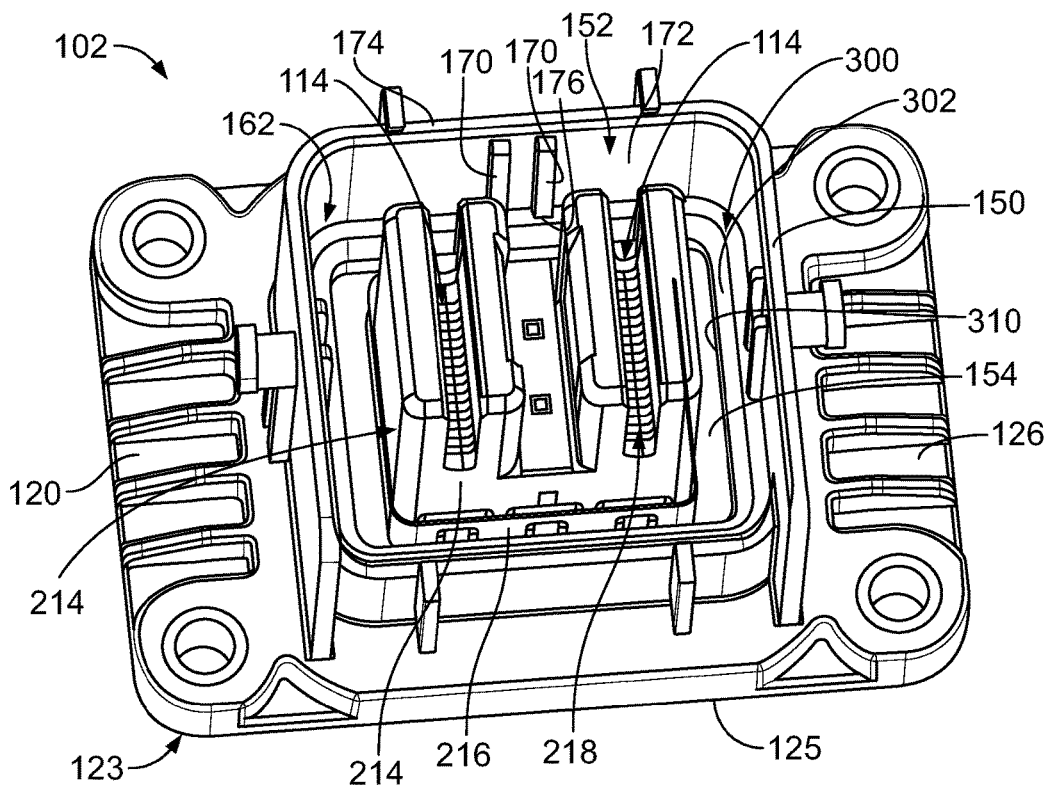
FIG. 5 is a top perspective view of the header connector showing the header seal in accordance with an exemplary embodiment.
Figure 6:
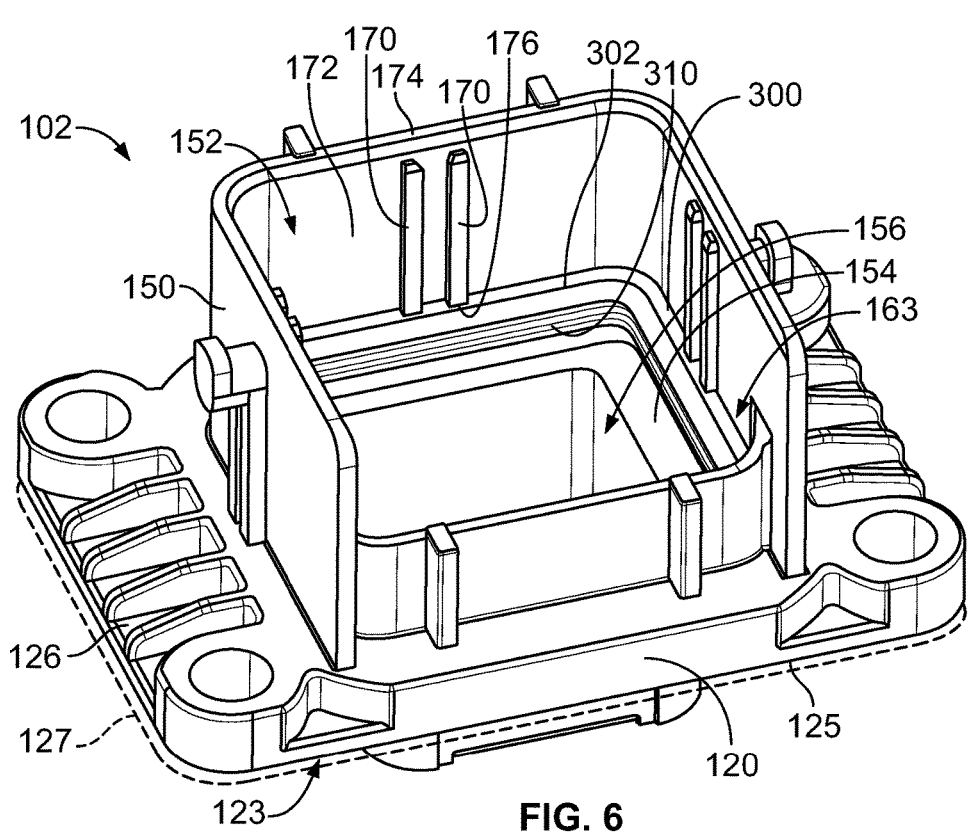
FIG. 6 is a top perspective view of a portion of the header connector showing the header housing and the header seal in accordance with an exemplary embodiment.
Figure 7:
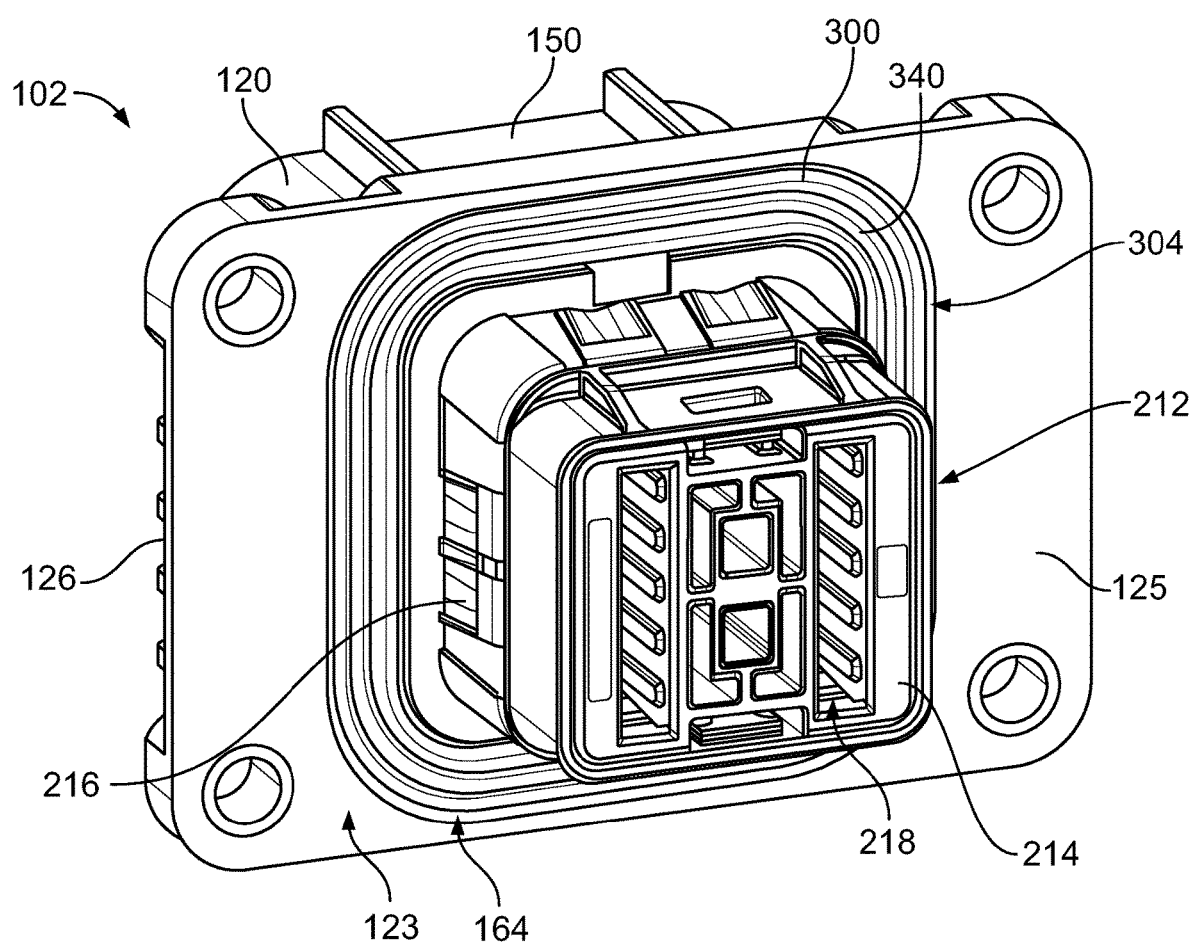
FIG. 7 is a bottom perspective view of the header connector showing the header seal in accordance with an exemplary embodiment.

FIG. 5 is a top perspective view of the header connector 102 showing the header seal 300 in accordance with an exemplary embodiment. FIG. 6 is a top perspective view of a portion of the header connector 102 showing the header housing 120 and the header seal 300 in accordance with an exemplary embodiment. FIG. 7 is a bottom perspective view of the header connector 102 showing the header seal 300 in accordance with an exemplary embodiment.

The header housing 120 includes a plurality of shroud walls 150 extending from the flange 126. The shroud walls 150 define a header chamber 152 configured to receive a portion of the plug connector 104 (shown in FIG. 2). In the illustrated embodiment, the shroud walls 150 form a rectangular shaped (for example, square shaped) header chamber 152. However, the shroud walls 150 may have other shapes, such as being circular shaped or oval shaped. The header housing 120 includes a floor 154 at a bottom of the header chamber 152. The floor 154 may be generally aligned with the flange 126 at the bottom of the header connector 102. In an exemplary embodiment, the floor 154 includes an opening 156 (FIG. 6) therethrough. The opening 156 receives the header terminal(s) 114. For example, the opening receives a terminal assembly 212 (FIGS. 5 and 7), which includes the header terminals 114. In an exemplary embodiment, the terminal assembly 212 is a separate component from the header housing 120 that is received in and held by the header housing 120.

The terminal assembly 212 includes a terminal holder 214, the header terminals 114 held by the terminal holder 214 and a shield 216 surrounding the terminal holder 214. The shield 216 provides electrical shielding for the header terminals 114. The shield 216 may extend into the header chamber 152 to electrically connect with the plug connector 104. The shield 216 may extend to the mounting end 123 to electrically connect with the supporting structure 127. For example, the shield 216 may be grounded to the supporting structure 127.

The header terminals 114 are received in terminal channels 218 of the terminal holder 214. The terminal channels 218 are open at the top to receive the plug terminals 116 (shown in FIG. 3). The terminal channels 218 are open at the bottom to receive the power busses 108 (shown in FIG. 3). The dielectric (for example, plastic) material of the terminal holder 214 supports the header terminals 114 and surrounds the header terminals 114 to define the header touch guards 124 to make the header connector 102 touch-safe. For example, support walls of the terminal holder 214 may be provided along sides and/or ends of the header terminals 114.

Optionally, the header connector 102 includes multiple header terminals 114. The header terminals 114 may define different circuits (for example, positive and negative) or may be part of common circuits. For example, two header terminals 114 configured to electrically connect to the same tab terminal 116 may be part of a common circuit, and header terminals 114 that are configured to mate to different tab terminals 116 may define different circuits. Optionally, providing multiple header terminals 114 increases the current carrying capability or capacity of the header connector 102.

The header connector 102 includes an upper channel 162 (FIGS. 5 and 6) that receives the upper portion 302 of the header seal 300 and a lower channel 164 (FIG. 7) that receives the lower portion 304 of the header seal 300. The header connector 102 includes one or more connecting channels 166 (shown in FIG. 8) extending between the upper channel 162 and the lower channel 164 that receive the connecting portions 306. The upper channel 162 is located in the header chamber 152. For example, the upper channel 162 may be formed, at least in part, by the shroud walls 150. The upper channel 162 may be open at the interior surface of the shroud walls 150. In the illustrated embodiment, the upper channel 162 is located at the floor 154. The upper channel 162 may extend at least partially into the floor 154. The upper channel 162 may be open above the floor 154. The upper portion 302 is formed in place in the upper channel 162. The upper sealing surface 310 of the upper portion 302 is located within the header chamber 152 to interface with the plug connector 104 (shown in FIG. 2). The lower channel 164 is located at the mounting end 123, such as at the bottom 125 of the header housing 120. The lower channel 164 may extend at least partially into the floor 154 and/or the flange 126. The lower portion 304 is formed in place in the lower channel 164. The lower sealing surface 340 of the lower portion 304 is located at the bottom 125 to interface with the support structure 127 (shown in FIG. 2). The connecting channels 166 extend through the floor 154 between the header chamber 152 and the bottom 125 of the header housing 120. The connecting portions 306 are formed in place in the connecting channels 166.

In an exemplary embodiment, the header housing includes stabilizing ribs 170 (FIGS. 5 and 6) extending along the shroud walls 150, such as along inner surfaces 172 of the shroud walls 150. The stabilizing ribs 170 are used to stabilize the shroud walls 150. The stabilizing ribs 170 may be used to locate the plug connector 104 in the header chamber 152. For example, inner surfaces of the stabilizing ribs 170 may engage the plug connector 104 to locate the plug connector 104 within the header chamber 152. The stabilizing ribs 170 extend between outer edges 174 of the shroud walls 150 (for example, top edges) and the floor 154. In an exemplary embodiment, bottom edges of the stabilizing ribs 170 are spaced apart from the floor 154 and may be spaced apart from the outer edges 174 of the shroud walls 150. Bottom edges 176 of the stabilizing ribs 170 may be located immediately above the upper portion 302 of the header seal 300 to retain the upper portion 302 in the header housing 120. For example, the stabilizing ribs 170 may block pull out of the upper portion 302, such as during unmating of the plug connector 104.

Figure 8:
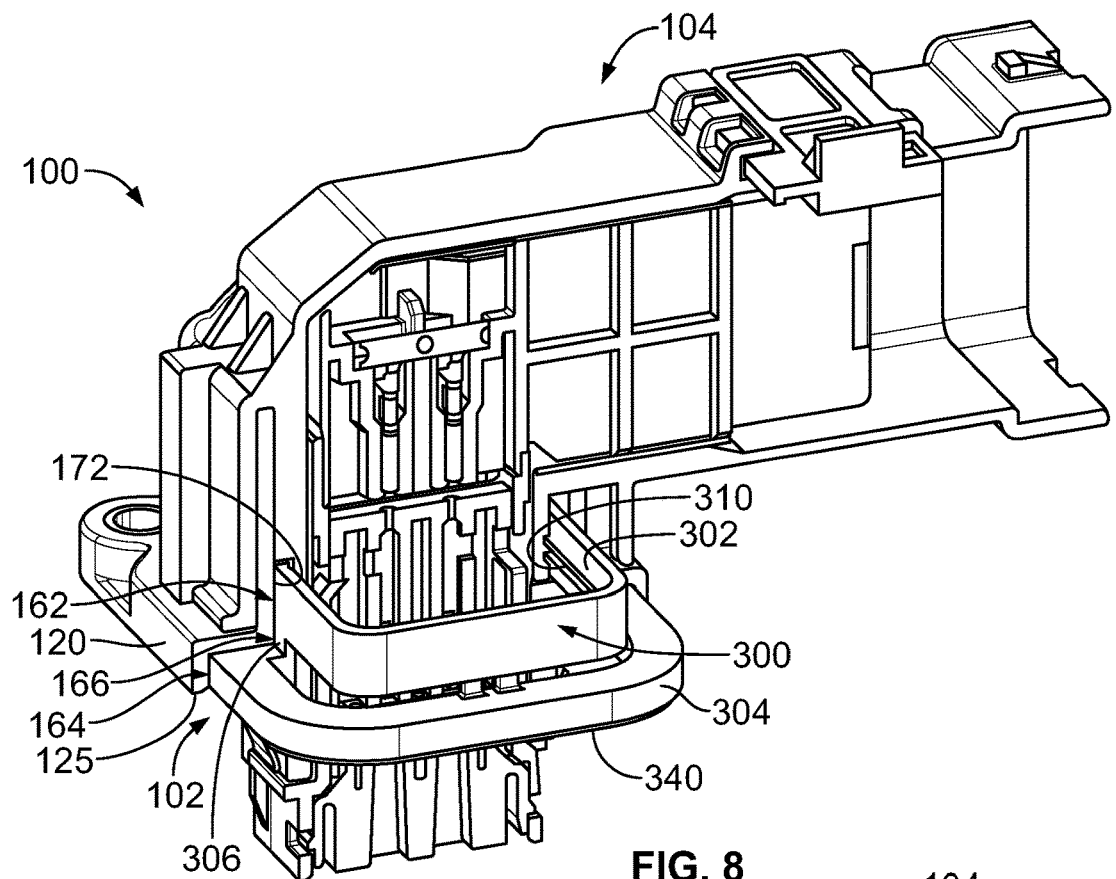
FIG. 8 is a partial sectional view of the power connector system in accordance with an exemplary embodiment showing the plug connector mated with the header connector.
Figure 9:
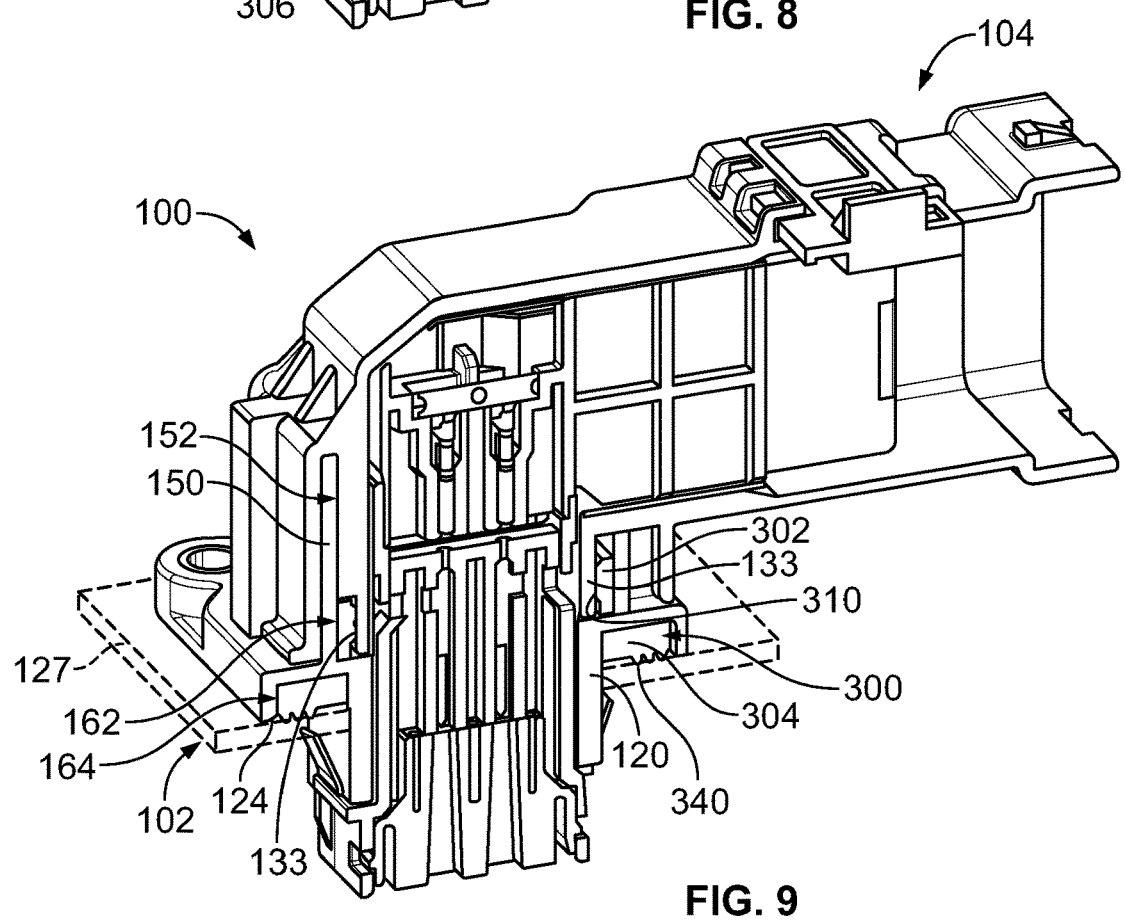
FIG. 9 is a partial sectional view of the power connector system in accordance with an exemplary embodiment showing the plug connector mated with the header connector.

FIG. 8 is a partial sectional view of the power connector system 100 in accordance with an exemplary embodiment showing the plug connector 104 mated with the header connector 102. FIG. 9 is a partial sectional view of the power connector system 100 in accordance with an exemplary embodiment showing the plug connector 104 mated with the header connector 102.

The header seal 300 is coupled to the header housing 120 to seal against the plug connector 104 and the support structure 127 (FIG. 9). The upper portion 302 is located in the upper channel 162, the lower portion 304 is located in the lower channel 164, and the connecting portions 306 are located in the connecting channels 106 (FIG. 8). The upper sealing surface 310 of the upper portion 302 is located within the header chamber 152 and extends along the inner surfaces 172 of the shroud walls 150 to interface with the plug connector 104, such as the sealing wall 133. The lower sealing surface 340 is located below the header housing 120 and extends along the bottom 125 of the header housing 120 to interface with the support structure 127. The upper sealing surfaces 310 face in an inward direction. The lower sealing surfaces 340 face in a downward direction, which is perpendicular to the inward direction.

Figure 10:
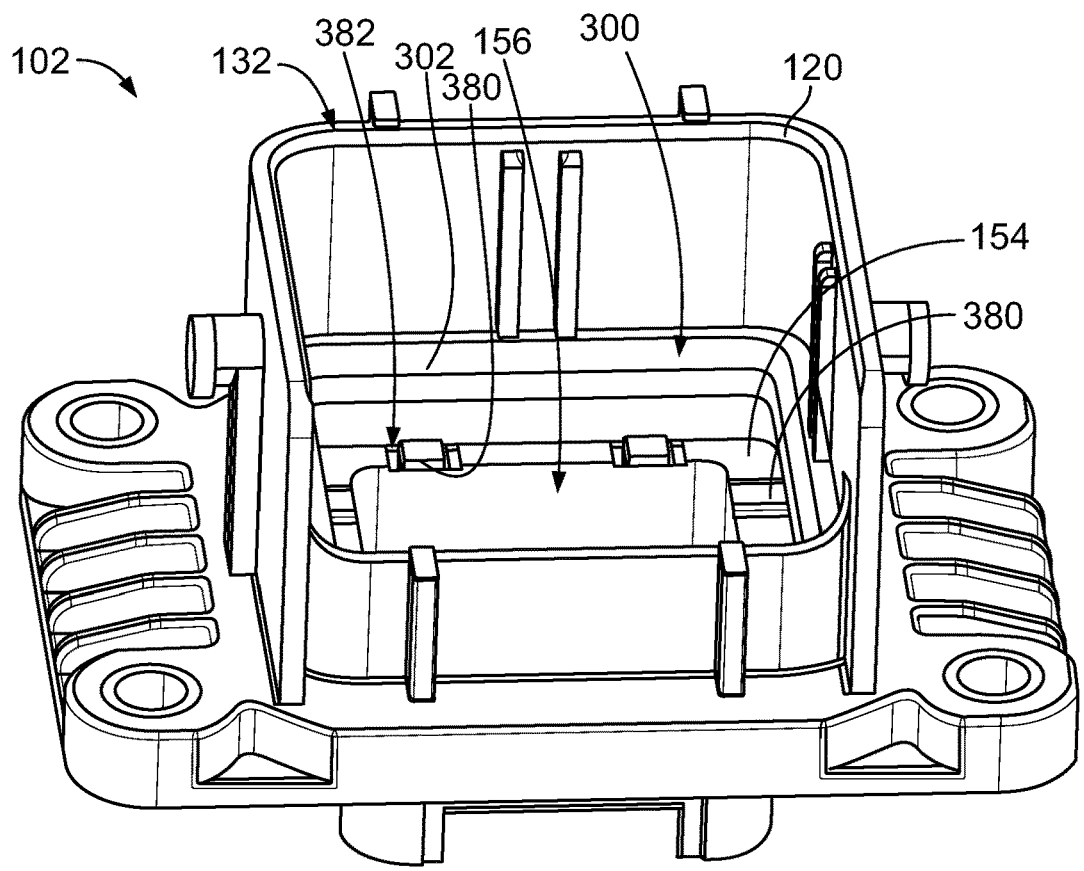
FIG. 10 is a top perspective view of a portion of the header connector showing the header housing and the header seal in accordance with an exemplary embodiment.

FIG. 10 is a top perspective view of a portion of the header connector 102 showing the header housing 120 and the header seal 300 in accordance with an exemplary embodiment. In the illustrated embodiment, the header seal 300 includes vibration reduction ribs 380 extending from the upper portion 302. The vibration reduction ribs 380 extend along the floor 154. Optionally, the vibration reduction ribs 380 may be received in pockets 382 formed in the floor 154. The vibration reduction ribs 380 may extend to the opening 156. The plug connector 104 is configured to engage the vibration reduction ribs 380 when the plug connector 104 (shown in FIG. 2) is mated with the header connector 102. For example, the mating end 132 (shown in FIG. 2) of the plug connector 104 may be seated on the vibration reduction ribs 380. The vibration reduction ribs 380 are deformable to dampen vibration of the plug connector 104 and/or the header connector 102. For example, the mating end 132 may be supported by the vibration reduction ribs 380 at an elevated position off of the floor 154 such that the mating end 132 is not seated on the hard surface of the floor 154.

Figure 11:
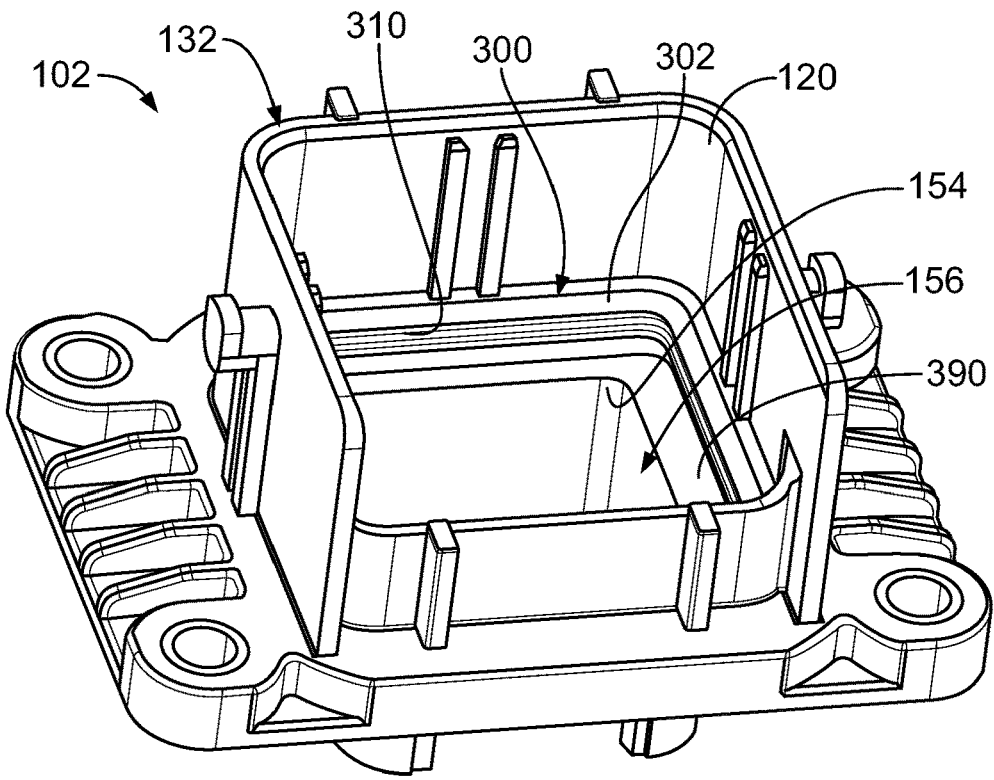
FIG. 11 is a top perspective view of a portion of the header connector showing the header housing and the header seal in accordance with an exemplary embodiment.

FIG. 11 is a top perspective view of a portion of the header connector 102 showing the header housing 120 and the header seal 300 in accordance with an exemplary embodiment. In the illustrated embodiment, the header seal 300 includes a floor gasket 390 extending from the upper portion 302. The floor gasket 390 extend along and covers the floor 154. The floor gasket 390 may extend to the opening 156. The plug connector 104 is configured to engage the floor gasket 390 when the plug connector 104 (shown in FIG. 2) is mated with the header connector 102. For example, the mating end 132 (shown in FIG. 2) of the plug connector 104 may be seated on the floor gasket 390. The floor gasket 390 is deformable to dampen vibration of the plug connector 104 and/or the header connector 102. For example, the mating end 132 may be supported by the floor gasket 390 rather than being seated on the hard surface of the floor 154. In an exemplary embodiment, the floor gasket 390 may provide a sealing surface for testing equipment, such as for pressure testing of the header connector during assembly and testing of the components. The floor gasket 390 defines a sealing surface separate from the upper sealing surface 310 to reduce damage of the upper sealing surface by the testing equipment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure

What is claimed is:

1. A header connector comprising:
   a header housing having a mating end and a mounting end, the mounting end configured to be mounted to a supporting structure, the header housing having shroud walls forming a header chamber configured to receive a plug connector, the header housing configured to hold a header terminal in the header chamber for mating with the plug connector; and
   a header seal coupled to the header housing, the header seal including an upper portion having an upper sealing surface and a lower portion having a lower sealing surface, the upper portion extending into the header chamber, the upper sealing surface configured to interface with the plug connector to form a seal between the header housing and the plug connector, the lower portion extending to the mounting end, the lower sealing surface configured to interface with the supporting structure to form a seal between the header housing and the supporting structure.

2. The header connector of claim 1, wherein the upper portion and the lower portion of the header seal are integral as a unitary monolithic structure.

3. The header connector of claim 1, wherein the header seal is molded in situ in the header housing.

4. The header connector of claim 1, wherein the header seal includes connecting portions extending between the upper portion and the lower portion of the header seal to connect the upper and lower portions at spaced apart locations.

5. The header connector of claim 1, wherein the header housing includes an upper channel in the header chamber and a lower channel at the mounting end, the header housing including at least one connecting channel open between the upper channel and the lower channel, the upper portion of the header seal being received in the upper channel, the lower portion of the header seal being received in the lower channel, the header seal including at least one connecting portion between the upper portion and the lower portion, the at least one connecting portion being received in the at least one connecting channel.

6. The header connector of claim 1, wherein the shroud walls include inner surfaces defining the header chamber, the upper sealing surface extending along the inner surfaces and facing inward into the header chamber, the mounting end being at a bottom of the header housing, the lower sealing surface extending along the bottom and facing downward.

7. The header connector of claim 1, wherein the upper sealing surface faces in a first direction and the lower sealing surface faces in a second direction perpendicular to the first direction.

8. The header connector of claim 1, wherein the upper portion is rectangular having first and second upper side segments and first and second upper end segments between the first and second upper side segments, the lower portion being rectangular having first and second lower side segments and first and second lower end segments between the first and second lower side segments, the upper portion being spaced apart from the lower portion, the header seal including a first side connecting portion between the first upper side segment and the first lower side segment, the header seal including a second side connecting portion between the second upper side segment and the second lower side segment, the header seal including a first end connecting portion between the first upper end segment and the first lower end segment, the header seal including a second end connecting portion between the second upper end segment and the second lower end segment.

9. The header connector of claim 1, wherein the upper portion includes sealing ribs, the sealing ribs being asymmetrical.

10. The header connector of claim 1, wherein the header housing includes a floor at a bottom of the header chamber, the header seal passing through the floor to connect the upper portion and the lower portion.

11. The header connector of claim 1, wherein the header housing includes a floor at a bottom of the header chamber, the header seal including vibration reduction ribs extending from the upper portion along the floor, the vibration reduction ribs configured to engage the plug connector.

12. The header connector of claim 1, wherein the header housing includes a floor at a bottom of the header chamber, the header seal including a floor gasket extending from the upper portion along the floor, the floor gasket configured to receive a mating end of the plug connector.

13. The header connector of claim 1, wherein the header housing includes stabilizing ribs extending from the shroud walls into the header chamber, the stabilizing ribs located between outer edges of the shroud walls and a floor of the header chamber, the upper portion located between the stabilizing ribs and the floor.

14. The header connector of claim 1, further comprising a removable shipping cap received in the header chamber during shipping and removable prior to loading the plug connector into the header chamber, the shroud walls including latch windows receiving latches of the shipping cap to retain the shipping cap in the header chamber.

15. The header connector of claim 1, wherein the header housing includes a flange at the mating end, the header housing including a floor at a bottom of the header chamber, the header housing including an opening in the floor, the header connector further comprising a terminal holder received in the opening, the terminal holder configured to hold the header terminal, the terminal holder being separate from the header housing and coupled to the header housing, the upper portion circumferentially surrounding the terminal holder and being spaced apart from the terminal holder above the floor, the lower portion circumferentially surrounding the terminal holder and being spaced apart from the terminal holder below the floor.

16. The header connector of claim 1, further comprising a header terminal received in the header chamber of the header housing, the header terminal including a plurality of contact members arranged side-by-side in a stacked arrangement, each contact member having a pair of spring beams defining a socket at a mating end of the contact member, the sockets of the contact members being aligned to define a tab socket of the header terminal configured to receive a plug tab of the plug connector.

17. A header connector comprising:
a header housing having a mating end and a mounting end, the mounting end having a flange configured to be mounted to a supporting structure, the header housing having shroud walls extending from the flange and forming a header chamber configured to receive a plug connector, the header housing having a seal channel extending through the flange from the header chamber to the mounting end;
a header terminal arranged in the header chamber for mating with the plug connector; and
a header seal coupled to the header housing, the header seal received in the seal channel, the header seal including an upper portion having an upper sealing surface and a lower portion having a lower sealing surface, the upper portion extending into the header chamber, the upper sealing surface configured to interface with the plug connector to form a seal between the header housing and the plug connector, the lower portion extending to the mounting end, the lower sealing surface configured to interface with the supporting structure to form a seal between the header housing and the supporting structure.

18. The header connector of claim 17, wherein the seal channel includes an upper channel in the header chamber, a lower channel at the mounting end, and at least one connecting channel open between the upper channel and the lower channel, the upper portion of the header seal being received in the upper channel, the lower portion of the header seal being received in the lower channel, the header seal including at least one connecting portion between the upper portion and the lower portion, the at least one connecting portion being received in the at least one connecting channel.

19. A power connector system comprising:
a header connector including a header housing having a mating end and a mounting end, the mounting end configured to be mounted to a supporting structure, the header housing having shroud walls forming a header chamber, the header connector including a header terminal arranged in the header chamber, the header connector including a header seal coupled to the header housing, the header seal including an upper portion having an upper sealing surface and a lower portion having a lower sealing surface, the upper portion extending into the header chamber, the lower portion extending to the mounting end, the lower sealing surface configured to interface with the supporting structure to form a seal between the header housing and the supporting structure; and
a plug connector mated with the header connector, the plug connector including a plug housing holding a plug terminal, the plug housing having a sealing wall, the plug terminal having a cable end and a mating end, the mating end being coupled to the header terminal during mating to electrically connect the plug terminal with the header terminal, the plug housing being received in the header chamber such that the sealing wall interfaces with the upper sealing surface of the upper portion of the header seal.

20. The power connector system of claim 19, wherein the upper portion is fixed relative to the header housing, the sealing wall of the plug housing moving into a sealed position against the upper portion of the header seal when the plug connector is mated with the header connector and the sealing wall of the plug housing moving away from the upper portion of the header seal when the plug connector is unmated from the header connector.

* * * * *